Patented Nov. 10, 1936

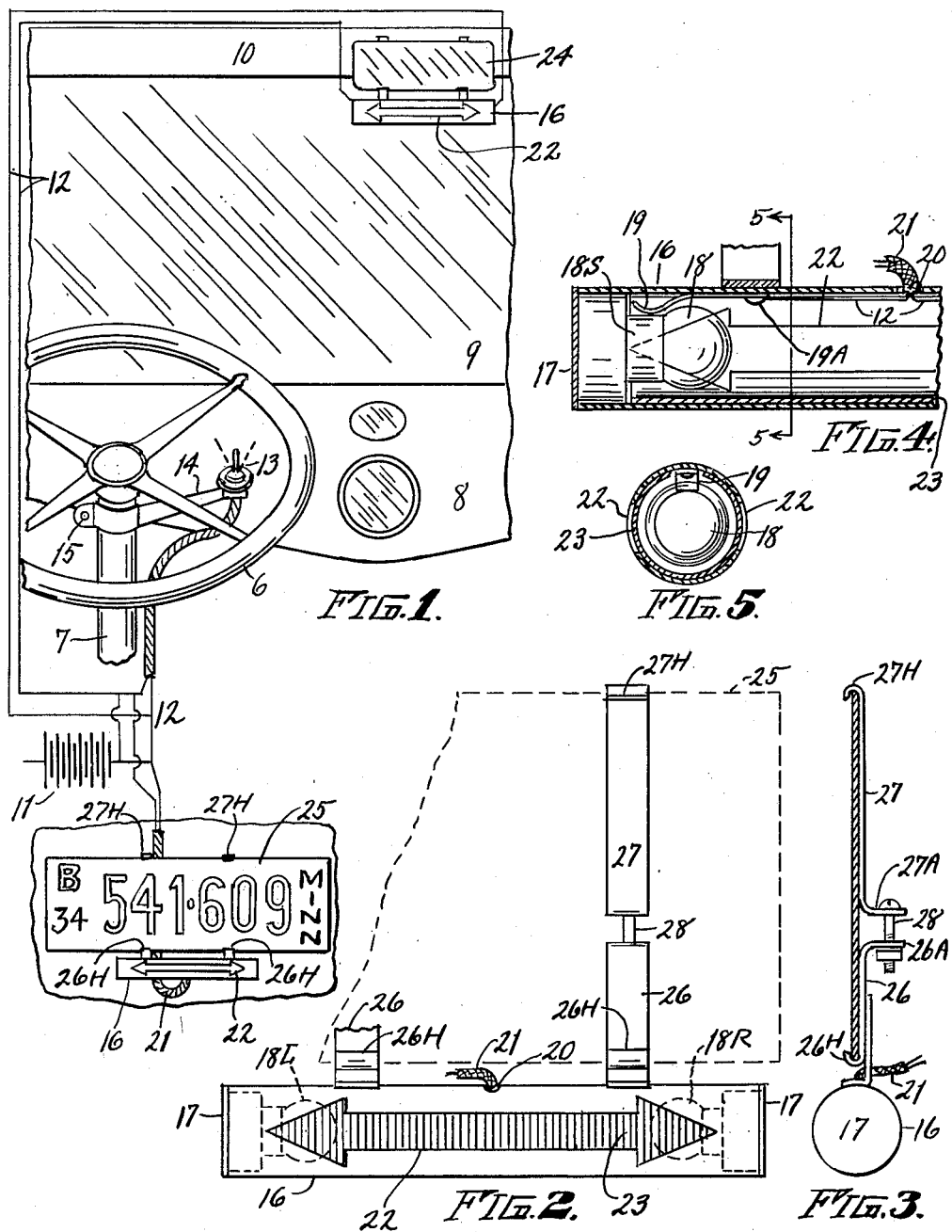

2,060,401

UNITED STATES PATENT OFFICE 2,060,401

DIRECTION SIGNAL

Joseph C. Smith, St. Paul, Minn.

Application May 25, 1935, Serial No. 23,383

1 Claim. (Cl. 177—329)

My invention relates to direction signals of a type applicable generally to all types of motor vehicles. It comprises mainly an elongated, hollow signal housing embodying unique signal means.

The main object of the invention is to provide a simple, highly efficient and inexpensive direction signal which is preferably mounted within the body of a car, for pleasure cars in connection with the rear view mirror and for other cars and trucks in connection with the rear license plate or in both places if two units of the device are deemed necessary. Further objects and advantages are set forth in the following specification and claims and as illustrated in the accompanying drawing, in which:—

Fig. 1 is mainly an interior view of a so-called pleasure car, looking forward as from the driver's seat, showing one of my signal devices attached to the rear-view mirror, and further showing another signal device secured to the rear license plate, both devices in electric circuit.

Fig. 2 is an enlarged elevation of my signal device and Fig. 3 is a right hand end elevation of Fig. 2 showing the license plate in cross section.

Fig. 4 is a longitudinal sectional elevation of approximately the left half of the signal device of the type having two arrow shaped windows or apertures.

Fig. 5 is a cross sectional detail view as on line 5—5 in Fig. 4, looking toward one end of the signal casing.

Referring to the drawing by reference numerals, 6 designates the steering wheel, 7 the steering wheel column, 8 the instrument board, 9 the windshield and 10 the horizontal frame part of a car over the windshield, all in approximately the usual relative positions and in Fig. 1 as seen from the driver's seat of an automobile.

11 designates a battery and 12 the circuit and 13 a tilting or snap switch (in circuit) suitably mounted on an arm 14 just under the steering wheel, said arm being attached as at 15 to the steering wheel column 7. The switch is located just below the plane of the steering wheel so that a finger of the driver's hand on the wheel can be used to operate the switch and close circuit to the signal means to indicate right or left turn.

The main part of my device consists of a tubular signal housing 16, normally in horizontally fixed position for signaling purposes. Each end of the housing is closed by a cap or plug 17 part of which projects into the housing and comprises a seat or socket for the stem part 18S of an electric bulb 18, which is put in circuit, when the plug 17 and bulb 18 are inserted, by means of a yieldable contact spring 19 which contacts stem 18S when the bulb is in place. The spring is fixed as by a terminal 19A to the upper wall of the housing (see Fig. 4). From each said terminal 19A a circuit wire 12 extends to an outlet 20 of the housing and from thence the wires may be in a cable 21.

The housing is provided in one or both of its sides with a double-headed arrow shaped aperture 22, this aperture being of such proportions that each of its head parts is horizontally opposite a bulb 18.

23 is an elongated tubular member of translucent, preferably red, material adapted to be slipped into either end of the tube and covering the arrow shaped apertures interiorly, bearing frictionally against the walls outwardly.

The signal housing is mounted in horizontal position, for pleasure cars preferably to the rear view mirror 24, low enough so that one arrow is exposed forwardly through the windshield and the other arrow exposed rearwardly.

Another signal housing of the same type but having only one, rearwardly exposed, arrow may be mounted rigidly to and in parallel position to the rear license plate, 25, in Fig. 1 and may be in circuit to provide right and left signal simultaneously with the first described signal device.

The dual signal device shown in upper part of Fig. 1 is deemed sufficient for pleasure cars however, because it is visible to traffic both ahead of and behind the vehicle being readily seen from the rear through the rear window of the car. For trucks, however, both signal means may be necessary but particularly the rear signal which has only one direction arrow 22.

In the use of my device, when a driver desires to signal a right turn he simply manipulates the switch 13 to close circuit to the right hand bulb (as 18R in Fig. 2) in either or both of the signal housings as the case may be. Thus the right hand end of the double pointed arrow is brightly illuminated and the shaft of the arrow extending therefrom also illuminated but the illumination of the shaft fading gradually toward the left. A left turn is indicated by corresponding manipulation of the switch closing circuit to bulb 18L and illuminating the left arrow head and adjacent part of the shaft of the arrow.

The form of my device shown in upper part of Fig. 1 (visible forwardly and rearwardly) is particularly useful and desirable. In use it can be seen by any number of persons in cars lined up in a row for example as in a place where a number of cars are stopped and awaiting signal to proceed at a street crossing or intersection.

The means for mounting my signal device are of secondary importance but I have shown, as a preferred device, a pair of rigid upwardly extending arms with their upper termini bent outward horizontally as 26A, said arms to bear against the front side of a rear-view mirror or a license plate.

Intermediate the ends of these arms is formed an upwardly opening hook, 26H, both to engage the lower edge of a license plate 25 or rear view mirror 24 simultaneously. For each fixed arm there is provided an upper L-shaped bar 27 with an upper hook 27H to engage the upper edge of the plate 24 or 25, the horizontal lower arm 27A being located each over and in spaced relation to arm 26A. Each pair of arms 27A and 26A are connected by means of a screw 28 which is adjusted to draw the clamp arms 26—27 toward each other and thus hold the signal rigidly.

It will be readily understood that because of the elongated shape of the double pointed arrow, when one bulb is lighted, only the adjacent arrow point is brightly illuminated, illumination of the adjacent shaft part of the arrow being tapered or growing actually more darkened toward the other end of the arrow. No partition is required in the housing.

Modifications may be embodied in the construction of the device and within the scope of the following claim:

I claim:

A direction signal adapted to be mounted adjacent and parallel to a windshield and comprising an elongated, horizontally disposed tubular housing provided with an elongated doubleheaded arrow shaped aperture in each of the horizontally opposite sides, a removable plug for each end of the housing each plug comprising an electric bulb holder retaining a bulb concentrically within the housing and adjacent an end of said apertures, electric circuit means for selectively lighting either bulb to light corresponding end parts of the housing and apertures to signal direction of auto movement, said latter means including for each bulb a yieldable spring contact in circuit and fixed within the housing and located to frictionally contact the contact stem of the bulb when the plug is in position to complete circuit to the bulb.

JOSEPH C. SMITH.